United States Patent
Duenas

[19]

[11] Patent Number: 5,820,254
[45] Date of Patent: Oct. 13, 1998

[54] REMOVABLE MOTORCYCLE LIGHT

[76] Inventor: Mark Duenas, 834 Via Bella Monica, San Marcos, Calif. 92069

[21] Appl. No.: 870,427
[22] Filed: Jun. 6, 1997

Related U.S. Application Data

[63] Continuation-in-part of Ser. No. 587,374, Jan. 16, 1996, abandoned.

[51] Int. Cl.⁶ ........................................................ B62J 6/00
[52] U.S. Cl. ............................ 362/473; 362/226; 362/540
[58] Field of Search ................................. 362/61, 72, 80, 362/83.3, 226, 473, 476, 540

[56] References Cited

U.S. PATENT DOCUMENTS

| | | | |
|---|---|---|---|
| 2,658,135 | 11/1953 | Woolfolk | 362/226 |
| 2,732,486 | 4/1956 | Osowski | 362/427 |
| 3,950,727 | 4/1976 | Smith | 340/134 |
| 4,099,222 | 7/1978 | Cornell et al. | 362/72 |
| 4,186,429 | 1/1980 | Johnston | 362/106 |
| 4,620,177 | 10/1986 | Hatanaka et al. | 340/81 R |
| 4,692,845 | 9/1987 | Widhalm et al. | 362/80 |
| 5,544,022 | 8/1996 | Blackard | 362/61 |

FOREIGN PATENT DOCUMENTS 6166391  11/1992  Japan .

Primary Examiner—Stephen F. Husar
Attorney, Agent, or Firm—Price, Gess & Ubell

[57] ABSTRACT

A system is provided for rapidly attaching and removing turn indicators from a motorcycle so that the cycle can be used either off-road or on highway. A base unit is permanently attached to the motorcycle in locations where turn indicators are normally placed. The base unit and the lamp unit cooperate to both connect the units structurally and electrically by employing a heel and shoe configuration. The heel of the base slides into a shoe, where mating electrical connections are made. The heel is then releasably locked into the shoe. Alternatively, the base unit has an inserting member, containing an electrical connector at its end opposite the attachment to the motorcycle. The inserting member is sized to fit into a receiving member of a separate lamp unit wherein the receiving member is located distally from an electric lamp of a stalked turn indicator. The receiving member contains a second electrical connector so that electrical connection between the lamp and the electrical system is made when the inserting member is inserted into the receiving member. This contact is maintained either by small studs protruding from the inserting member and interlocking with complementary grooves on an inner surface of the receiving member, or, in an alternative embodiment, by a threaded rotatable sleeve disposed about the inserting member for interacting with complementary threads on the receiving member. In either case the lamp unit can be rapidly removed from or positively locked into operational position on a motorcycle.

9 Claims, 7 Drawing Sheets

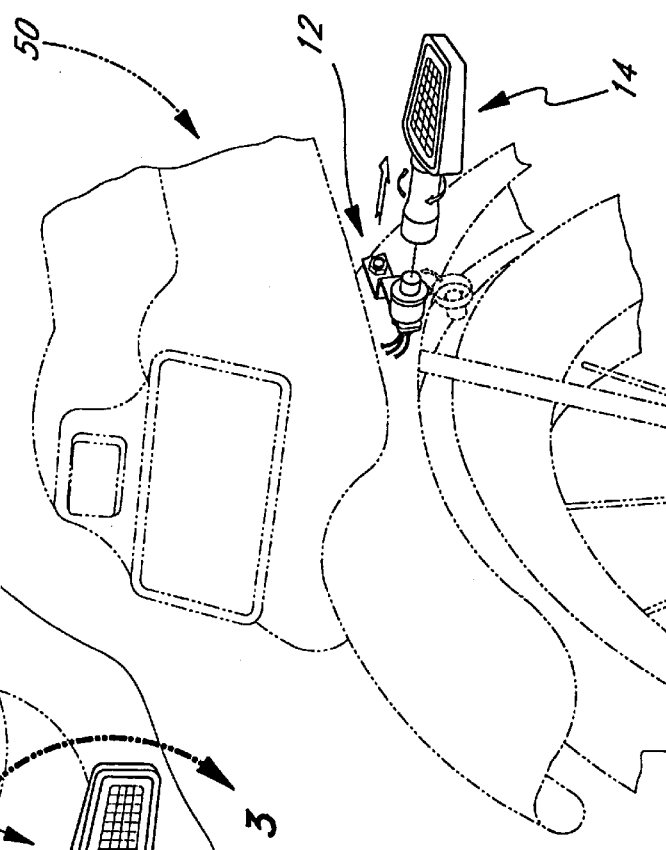
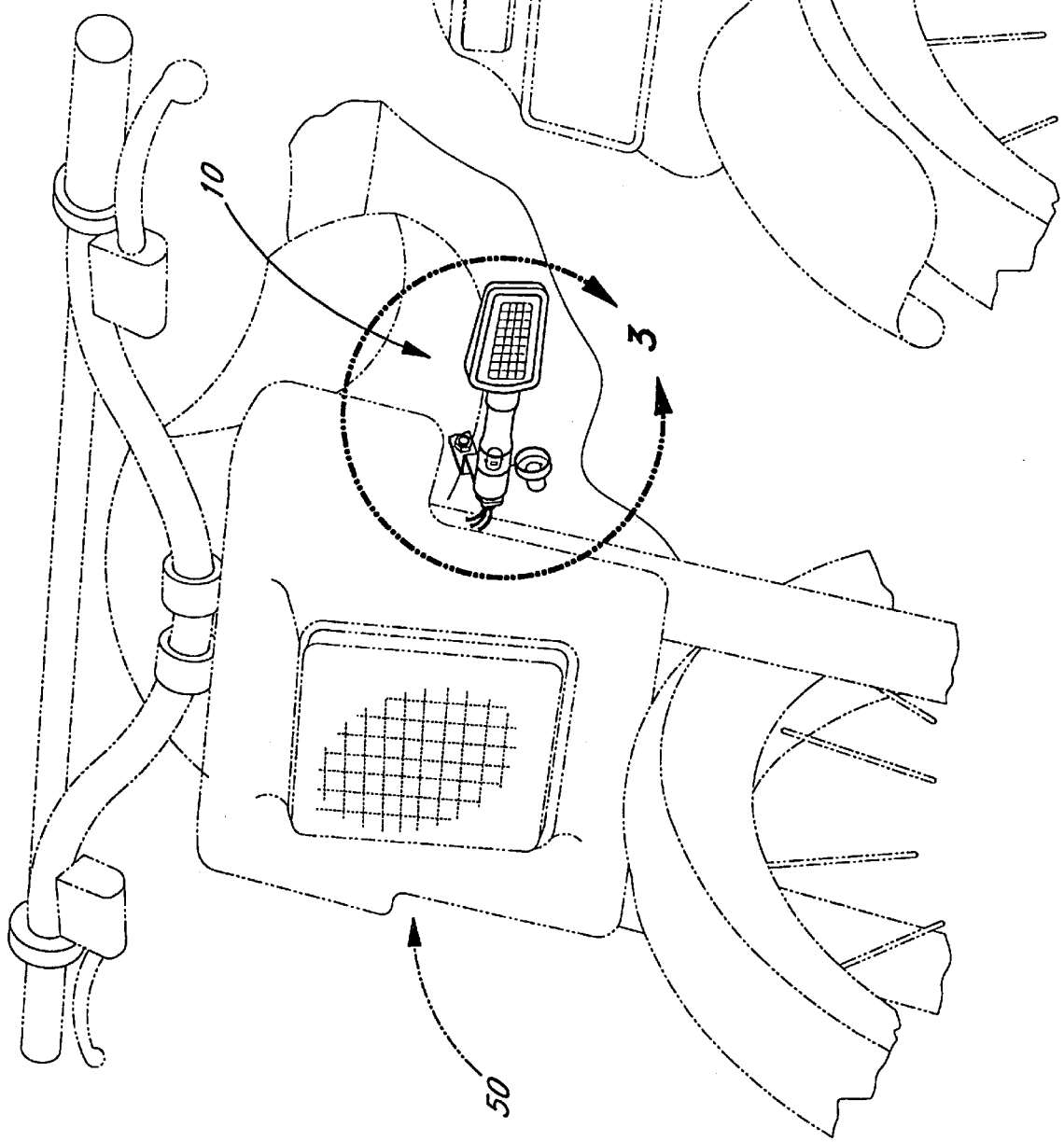
FIG. 1
FIG. 2

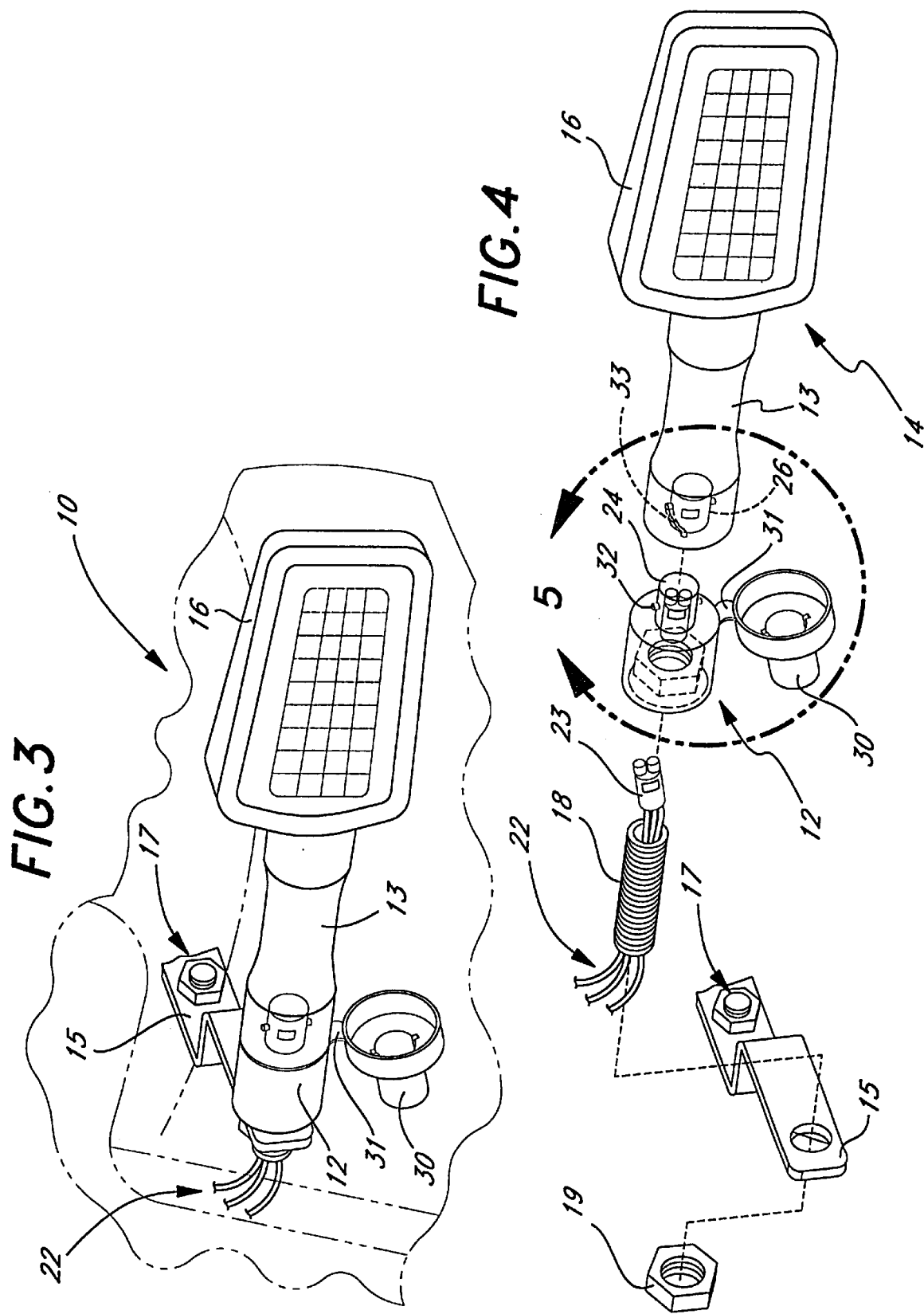

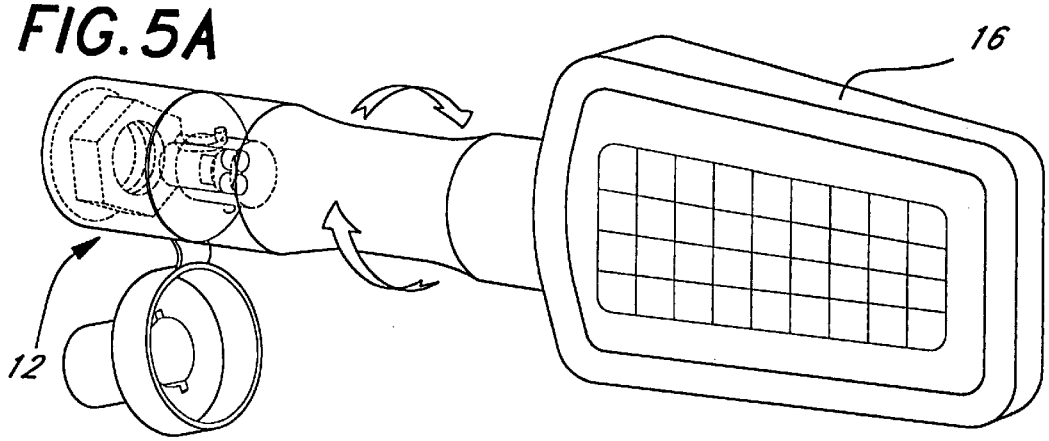
FIG.5A
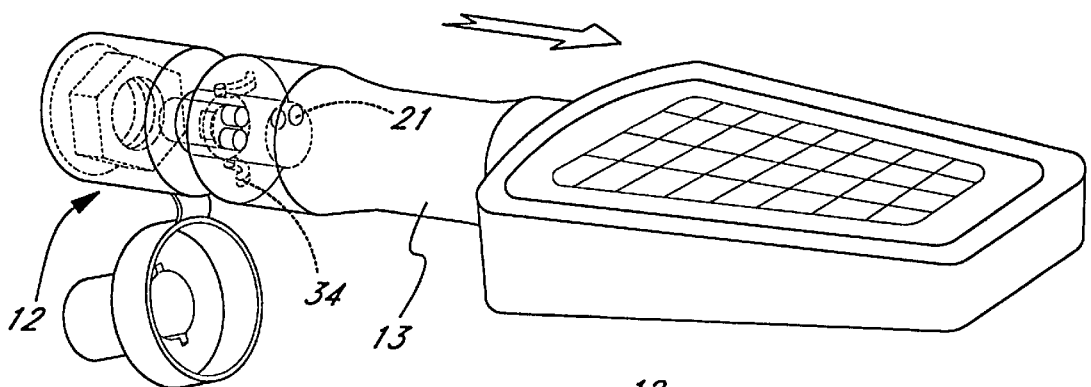
FIG.5B
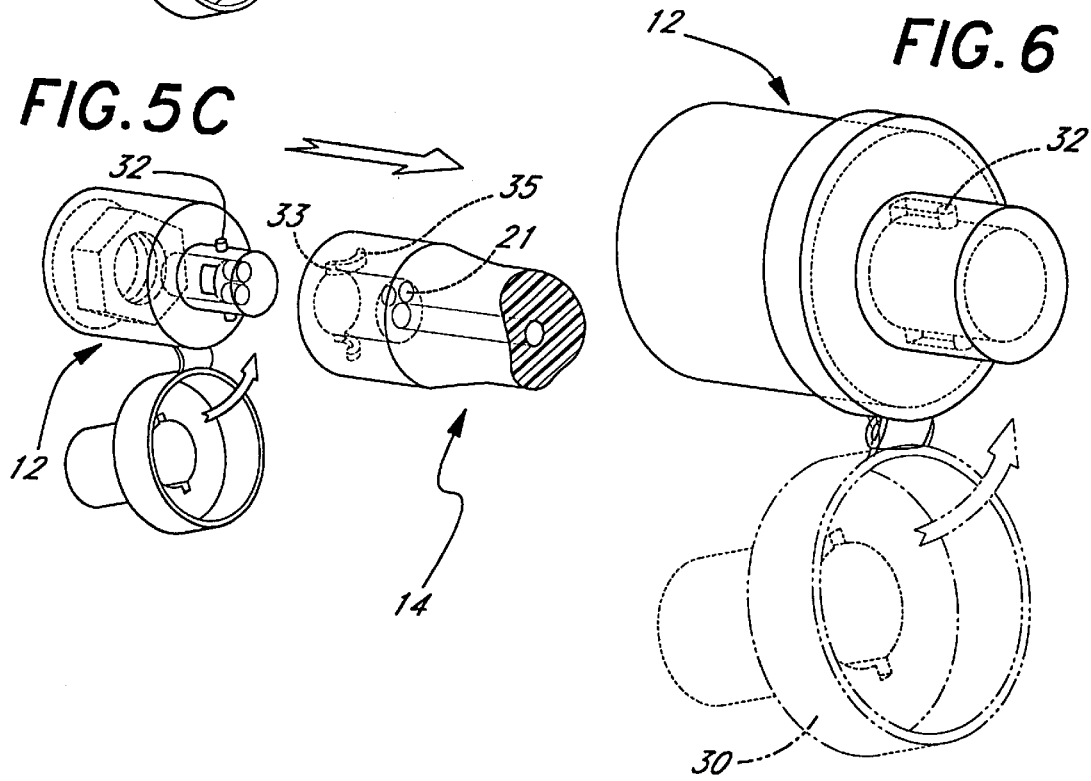
FIG.5C
FIG.6

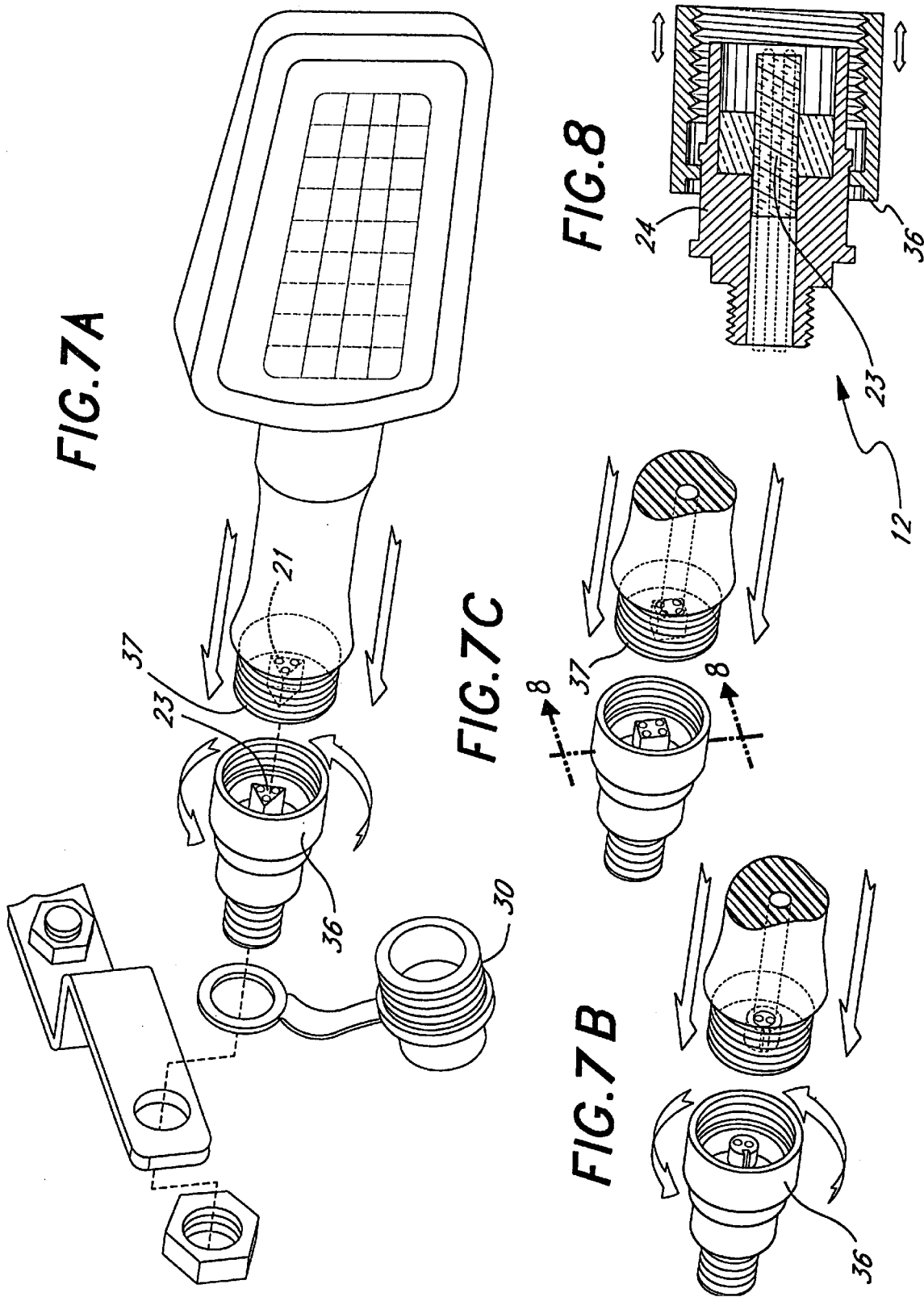

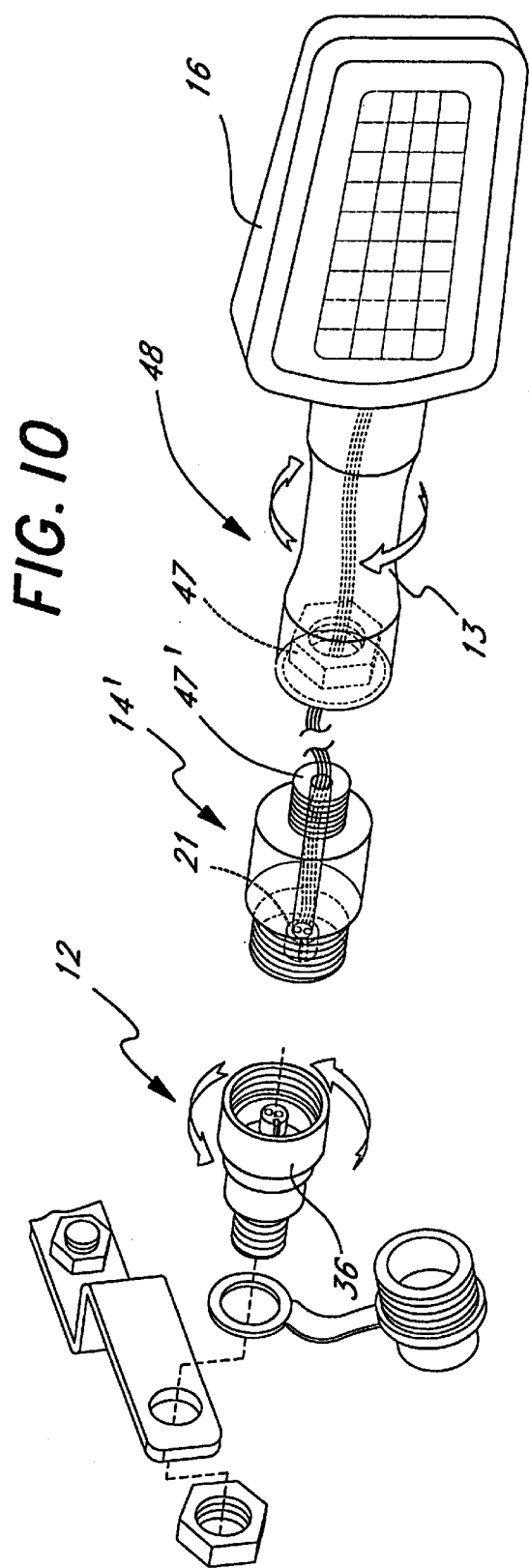
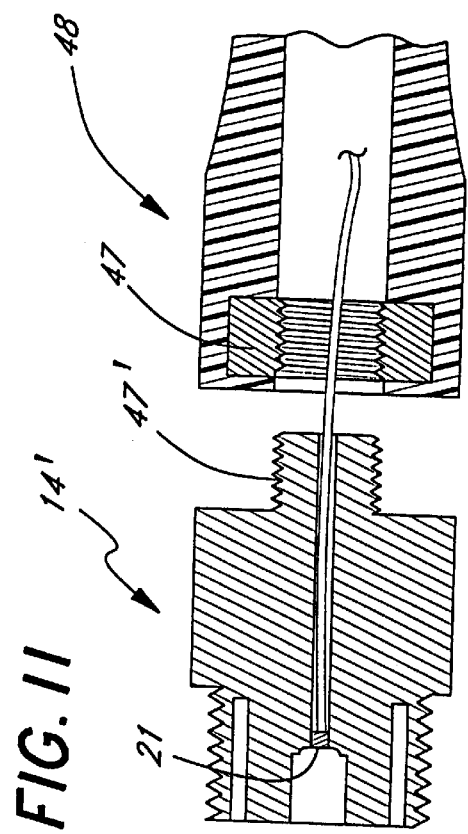
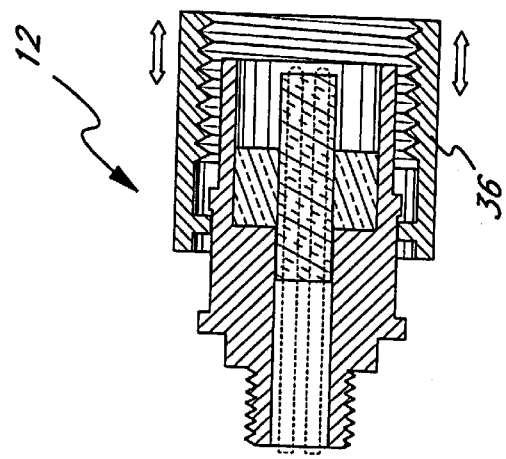

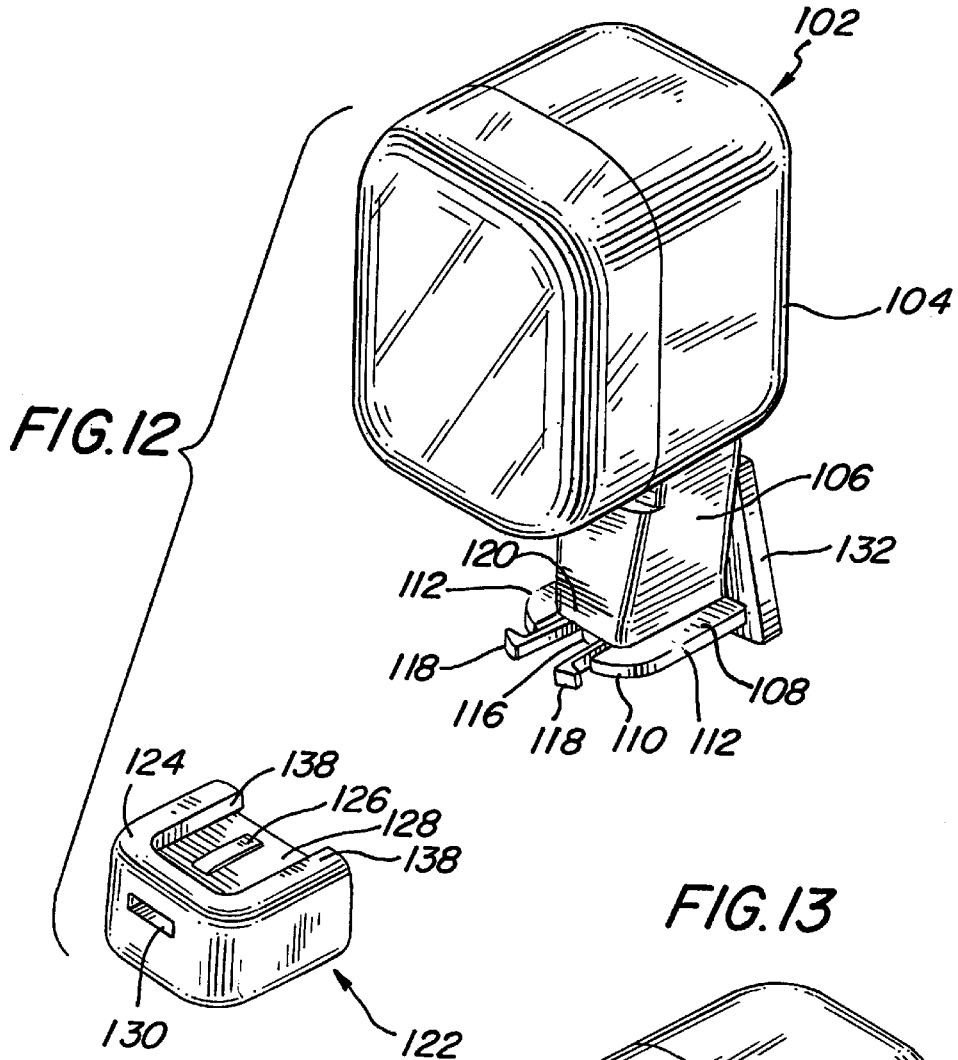
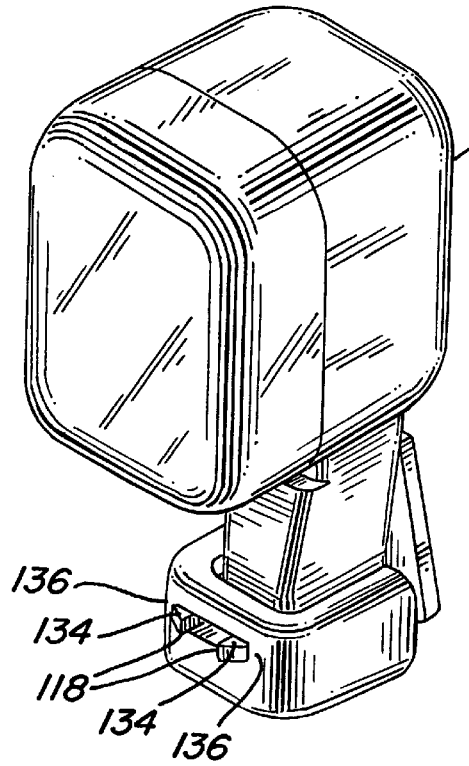

REMOVABLE MOTORCYCLE LIGHT

CROSS-REFERENCE TO RELATED APPLICATIONS

This is a continuation-in-part of application Ser. No. 08/587,374, filed Jan. 16, 1996, now abandoned.

BACKGROUND OF THE INVENTION

1. Field of the Invention

The present invention concerns lighting for motor vehicles and, more specifically, relates to a removable turn indicator light for a motorcycle.

2. Description of Related Art

Motorcycles are currently a very popular means of transportation as well as recreation. Many people use motorcycles on the highways in place of an automobile. For this purpose the cycles are subject to a number of highway safety laws and regulations which affect many parts of the cycles, including brakes and especially including vehicle lights. Not only must a motorcycle have a head lamp and a brake light, much like an automobile, cycles for highway use must have special turn indicator lights.

Because a motorcycle has only a single brake light, it is not feasible to use that light as a turn signal indicator. Instead, the turn signal indicator lamps are mounted on posts or "stalks" on either side of the front and rear fenders of a cycle. A usual cycle will have four protruding lamps, two on either side. The stalks provide separation between the turn signal indicators so that turning direction can be readily ascertained by other drivers at a considerable distance from the motorcycle.

Besides highway or on-road use of motorcycles, "off-road" or "dirt bikes" are of increasing popularity. Off-road motorcycles are similar to regular motorcycles, but usually have special tires and suspensions to allow a rider to climb hills following a dirt trail or no trail at all. Because of the special characteristics of off-road motorcycles, it has been common for a rider to truck his or her off-road motorcycle to an appropriate site. However, not every rider has access to a truck capable of carrying motorcycles. Young single riders are particularly unlikely to be able to afford to truck motorcycles from a city to a rural recreation area.

The solution to this problem has been the development of dual purpose motorcycles that are highway legal and can be used for normal transportation purposes or can be driven to an off-road motorcycle recreation site. Because dual purpose motorcycles can be driven on highways, they must be equipped with regular motorcycle turn indicators. Unfortunately, these turn indicators are a great nuisance for off-road riding. They can get caught on bushes as the cycle is ridden off the path. Worse, when the cycle takes a spill—as is often the experience in off-road riding—the turn signal indicators can become damaged beyond repair or can break and snap off completely necessitating replacement.

To partially deal with these problems, the post or stalks of most dual-purpose motorcycle turn indicators are made somewhat flexible so as to bend rather than becoming damaged or snapping off. U.S. Pat. No. 3,950,727 to Smith shows one possible design for such a flexible turn indicator. Nevertheless, even a flexible turn indicator cannot survive the weight of a motorcycle lying on the indicator and possibly sliding at the same time. The "low tech" solution to this problem has been to simply remove the turn signal indicators before off-road riding. Unfortunately, standard turn indicators are difficult and inconvenient to remove and replace.

The current invention solves the turn signal problem by providing a means for ready removal and replacement of the turn signal indicators. If a motorcycle is equipped with turn signal indicators of the present invention, it is a simple thing to drive the cycle to an off-road recreational area, quickly remove the indicators and store them in a knapsack, for instance. At the end of the day the cycle is returned to the highway, and the turn signal indicators are rapidly replaced for the ride home.

OBJECTS AND SUMMARY OF THE INVENTION

A main object of the present invention is to provide readily removable turn signal indicators so that a single motorcycle can be driven as either a highway cycle or an off-road cycle;

It is another object of the present invention to provide means to prevent dirt or mud from affecting the turn signal indicator removal or replacement; and It is a further object of the present invention to provide adapters whereby existing turn signal indicators can be converted into removable turn signal indicators.

These and further objects are met by system consisting of a base unit permanently attached to the motorcycle and a connectable lamp unit. In a first embodiment of the present invention, the base unit has an inserting member which contains an electrical connector that is connected to the electrical system of the motorcycle. The inserting member is sized to fit into a receiving member which is located on the lamp unit distally from an electric lamp. The receiving member contains a second electrical connector so that electrical connection between the lamp and the electrical system is made when the inserting member is inserted into the receiving member. This contact is maintained either by small studs protruding from the inserting member and interlocking with complementary grooves on an inner surface of the receiving member, or in an alternative embodiment, a rotatable sleeve disposed about the inserting member for interacting with the receiving member.

In a second embodiment, the end of the lamp unit forms a heel which includes an electrical contact along the lower surface. The base unit comprises a shoe into which the heel is slid, with a mating electrical contact at adjoining surfaces to complete the connection. The heel is locked into position inside the shoe using resiliently biased bayonets on the heel which project through a hole in the shoe and spring apart, thereby securing the heel in the shoe.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 shows the present invention in use as a front turn signal indicator on a motorcycle;

FIG. 2 shows the present invention in use as a rear turn signal indicator on a motorcycle;

FIG. 3 shows a close-up of the turn signal indicator of the present invention;

FIG. 4 shows a close-up of the turn signal indicator with the base unit and the lamp unit separated;

FIG. 5A shows a first step in removing the lamp unit from the base unit;

FIG. 5B shows a second step in removing the lamp unit from the base unit;

FIG. 5C show a third step in removing the lamp unit from the base unit;

FIG. 6 shows a detailed view of the dust cap being attached to the base unit;

FIG. 7 shows a detailed view of an alternative embodiment employing a threaded sleeve;

FIG. 8 shows a detailed view of the embodiment of FIG. 7 with the lamp unit removed from the base unit;

FIG. 10 shows the embodiment of FIG. 7 used as and adapter;

FIG. 11 shows a cross-section of the device of FIG. 10;

FIG. 12 shows a perspective view of an alternate embodiment of the present invention; and FIG. 13 shows the embodiment of FIG. 12 in the assembled configuration.

DETAILED DESCRIPTION OF THE PREFERRED EMBODIMENTS

Figure 9:
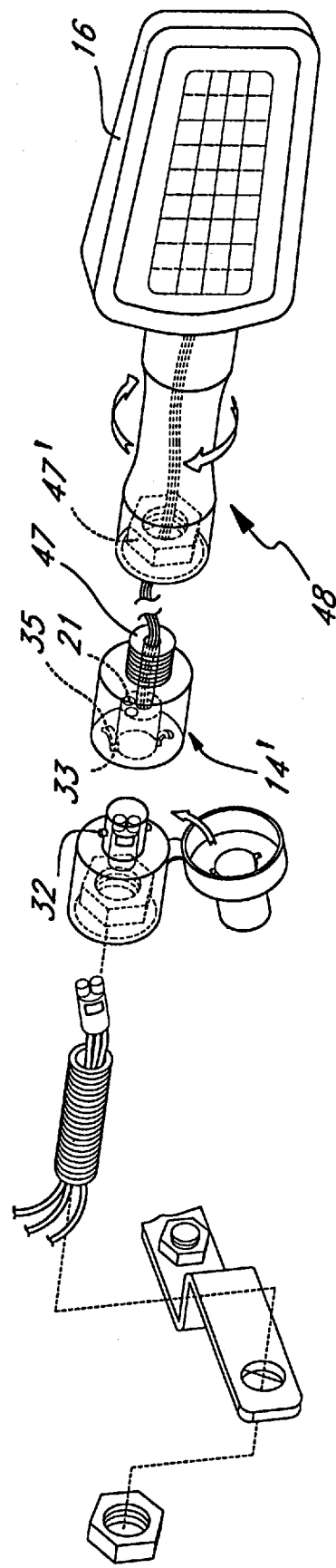
FIG. 9 shows the embodiment of FIG. 1 used as an adapter to removable attach an ordinary turn signal indicator.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a readily removable and replaceable turn signal indicator for a motorcycle.

FIG. 1 shows a front portion of a motorcycle 50 equipped with a turn signal indicator 10 of the present invention. FIG. 2 shows a rear portion of the motorcycle 50 with the turn signal indicator 10 of the present invention. In this case a lamp unit 14 has been detached from a base unit 12 showing how the lamp unit 14 can be readily detached for safe storage. The lamp unit 14 comprises a basal receiving member 26 connected by a stalk 13 to a lens unit 16.

FIG. 3 shows an enlarged view of the turn signal indicator 10. The base unit 12 is shown mounted on a bracket 15. This mechanism is shown exploded in FIG. 4. The bracket 15 is attached to the motorcycle 29 by a nut and bolt 17. A threaded tube 18 passes through the bracket 15 and is secured on one surface of the bracket 15 by a nut 19. The threaded tube 18 is fixed to the bracket 15 by means of the base unit 12 which is interiorly threaded to receive the threaded tube 18. Other mounting arrangements can be readily applied as is clear to those of ordinary skill in the art. In many applications the bracket 15 may be replaced by part of the motorcycle, i.e., a fender, and the base unit 12 will be mounted directly onto a portion of the motorcycle 50.

Electrical wires 22 from the electrical system of the motorcycle 50 pass through the threaded tube 18 and terminate in a base connector 23. In this case three wires 22 are shown: a ground wire, a wire for the turning signal, and a wire for a running light. The actual number of wires 22 varies with the exact configuration. Ground may be provided through the frame of the motorcycle 50; a running light may not be provided.

The base connector 23 and is surrounded by an inserting member 24 which can be seen more clearly in FIG. 5. Although the base connector 23 is shown apart from the inserting member 24 in FIG. 4 for sake of clarity, it is more usual to have the connector and the inserting member joined during manufacture. The base connector 23 can be manufactured with the wires 22 attached. Alternatively, the wires can be soldered or crimped to the base connector 23 at the time that the base unit 12 is attached to the motorcycle 50.

The inserting member 24 is sized to fit within a receiving cavity of the receiving member 26. The inserting member 24 can also be described as the "male" portion, while the receiving member 26 forms the "female" portion of the device. In the drawings the inserting member 26 is shown as being attached to the motorcycle 50, while the receiving member 26 is part of the turning indicator lamp unit 14. Of course, it is simple to reverse these positions and place the inserting member 24 on the lamp unit 14. However, it should be appreciated that there is a significant danger of the receiving member 26 becoming accidentally filled with dirt or mud if it is placed on the motorcycle 50.

Even though the inserting member 24 is less likely to become encrusted with dirt because it lacks the receiving cavity of the receiving member 26, it may still be damaged by contact with the ground or other impacts. Therefore, a dust cap 30 is provided (see FIG. 6). The dust cap 30 is preferably attached to the base unit 12 by a flexible tether 31 or some similar attachment means. The dust cap 30 is preferably molded from durable plastic such as high density polyethylene and is shaped to snap over the exposed inserting member of the base unit 12. A similar cap can be provided to protect the receiving member, but is generally unnecessary since the entire lamp unit 14 is generally stored in a protected location and is not likely to become dirt encrusted. An alternate embodiment (not shown) replaces the dust cap 30 with a series of flexible blades arranged iris-like to cover the receiving cavity 27 of a receiving member mounted on the motorcycle 50. The blades close the receiving member 26 against dirt, but are sufficiently flexible to admit the penetration of the inserting member 24.

The inserting member 24 bears retaining means to stabilize the interaction between the receiving and inserting members, in this case, retaining studs 32 protruding from its outer surface. These studs 32 are sized to fit into retaining grooves 33 located on the receiving member 26. To attach the lamp unit 14 to the base unit 12 the retaining studs 32 are aligned with the corresponding retaining grooves 33. This task can be facilitated by marks or symbols (not shown) embossed or printed on the base unit 12 and the lamp unit 14. Note that a lamp connector 21, which is designed to mate with the base connector 22, is not properly aligned with the base connector 22 when the studs 32 are aligned with the retaining grooves 33.

When the lamp unit 14 is pushed towards the base unit 12, the retaining studs 32 move within the retaining grooves 33 until the lamp connector 21 contacts the base connector 23. Either the lamp connector 21 or the base connector 23 is spring-loaded (not shown) so that further movement of the lamp unit 14 relative to the base unit 12 is springingly resisted. Pressing the lamp unit 14 against this spring action causes the retaining studs 32 to bottom at the ends of the retaining grooves 33. Traverse retaining grooves 33' extend at right angles in a clockwise direction from the retaining grooves. A counterclockwise rotation of the lamp unit 14 allows the retaining studs 32 to move into the traverse grooves 33' and brings the lamp connector 21 into proper registration with the base connector 23. Spring pressure forces the retaining studs 32 into detentes 34 which lock the lamp unit 14 into place.

The lamp unit 14 can be easily released by pressing the lamp unit 14 towards the base unit 12 (FIG. 5A), thereby freeing the retaining studs 32 from the detentes 34 permitting the lamp unit to be twisted clockwise (FIG. 5B) to align the studs 32 with the grooves 33 for removal (FIG. 5C).

FIG. 7 shows a detailed view of an alternative embodiment. Here the inserting member 24 is surrounded by a freely rotatable threaded sleeve 36 which acts as a retaining means. The receiving member 26 has a fixed threaded collar 37 surrounding the receiving cavity. After the inserting member 24 is inserted into the receiving member 26, the sleeve 36 is rotatably engaged with the threaded collar 37 and tightened to lock the base unit 12 and the lamp unit 14 together.

The cylindrical threaded sleeve 36 is preferably of metal and surrounds a bottom portion of the lamp unit 14, strengthening it against accidental damage. Note that the base connector 23 and the lamp connector 21 are keyed to ensure that the lamp unit 14 is in a correct relationship to the rest of the motorcycle 50 when the inserting member 24 is inserted into the receiving member 26. A threaded dust cap 30' may be threaded onto the inserting member to keep out dirt. Of course the device can be constructed so that the rotatable sleeve 36 surrounds the receiving member 26 instead. The interaction between the rotatable sleeve 36 and the fixed collar 37 may involve structures other than threads, for example retaining studs 32 on the fixed collar 37 could interact with retaining grooves 33 on the rotatable sleeve 36, etc.

The present invention has been described as being an integral part of the turn indicator. That is, the lamp unit 14 contains the receiving member 26, the stalk 13 and the lens unit 16 as a single manufactured piece. This is the preferred way of using the present invention, but many people already own motorcycles with old fashion fixed-in-place turn indicators. Often these indicators are of a special color or design to complement the motorcycle design. It may not be economical to manufacture custom indicators to retrofit all the older motorcycles.

Instead, the present invention can be produced as a retrofit adaptor kit as shown in FIGS. 9, 10 and 11. The base unit 12 is substantially as previously described. To install the base unit 12 all that is necessary is to remove the original turn indicator, cut the wires, connect the wires to the base connector 23, and insert the base unit 12 in place of the original turn indicator. The original turn indicator 48 then comprises a lens unit 16, a stalk 13, and a threaded attachment nut 47. A lamp adaptor 14' comprises the receiving member 26, the lamp connector 21, and a threaded member 47' to be received by the threaded attachment nut 47 of the original turn indicator 48. The wires to the lens unit 16 are connected to the lamp connector 21, the threaded member 47' is threaded into the lamp adapter 14', thereby converting the original turn indicator into a lamp unit 14 of the present invention.

A second embodiment is shown in FIG. 12 which shows a lamp unit 102 comprising a lamp 104 and a support 106 which includes a heel 108. The heel 108 preferably has a rounded front portion 110 and parallel sides 112, and is relatively flat. Along an under surface of the heel 108 is an electrically conductive terminal in the form of a resilient metallic strip 116. The electrically conductive terminal is connected to the wiring (not shown) of the lamp to communicate an electric current to the lamp, which in turn is used to illuminate the lamp 104. The heel 108 also includes a pair of tapered bayonets 118 which project from a front surface 120 of the heel 108, and are resiliently biased apart.

To receive the lamp unit 102, a base unit 122 is provided which is mountable to the motorcycle chassis using methods described in the earlier embodiments. The base unit 122 includes a shoe 124 which has peripheral guides 138 for slidingly receiving the heel 108 of the lamp unit therein. The base unit 122 includes an electrical connector 126 on an upper surface 128 is adapted to cooperate with the resilient strip 116 on the heel 108 to complete the electrical connection between the base unit 122 and the lamp unit 102.

The shoe 124 also includes a slot 130 which is sized to receive the bayonets 118 of the heel 108 therein, where the bayonets 118 are momentarily compressed together in order to pass through the slot 130. Once through the slot 130, the resilient bayonets 118 spring apart to lock the heel 108 in the shoe 124. To remove the heel 108, the bayonets 118 must be compressed together such as between a thumb and forefinger, and removed from the slot 130. The bayonets 118 are protected by the support 106, and in particular by the shield 132, from oncoming obstacles when the motorcycle is driven. As described, the present embodiment will provide a reliable quick-release mechanism for securing turn signals to a motor cycle.

FIG. 13 illustrates the turn signal of the present invention in the engaged configuration. Bayonets 118 can be observed projecting through slot 130 where tabs 134 on the ends of the bayonets 118 engage the rear surface of the shoe 134. Other locking mechanisms can be substituted in order to retain the heel in the shoe. For example, a spring loaded tab, initially depressed while the heel is inserted in to the shoe, may deploy once the heel is fully inserted into the shoe thereby releasably securing the heel in the shoe.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A turn indicator for easy attachment to and removal from a motor cycle comprising:

a base unit having first and second ends, said base unit comprising:
        means for permanently attaching the base unit to a motorcycle at said first end;
        an electrical connector disposed within said base unit in electrical communication with an electrical system of the motorcycle;
        a connector at said second end of said base unit including a projection at an end thereof, said projection having means for retaining a lamp unit on said base unit and means for electrically connecting said lamp unit to said base unit; and
    the lamp unit having first and second ends, said lamp unit comprising:
        an electric lamp at said first end;
        an electrical connector disposed within said lamp unit in electrical communication with the electric lamp and in electrical contact with the electrical connector of the base unit when the lamp unit is retained in removable contact with the base unit; and
        a recess at said second end of said lamp unit sized to receive said projection firmly therein, said second end including grooves adjacent said recess cooperating with the means for retaining the lamp unit to retain the lamp unit in removable contact with the base unit.

2. The turn indicator of claim 1, wherein the means for retaining the lamp unit comprises studs sized to cooperate with said grooves such that said studs are captured by said grooves when said projection is inserted into said recess and thereafter rotated.

3. The turn indicator of claim 1 wherein the grooves are curvilinear and said grooves are positioned to fix said lamp in a proper orientation when said studs are rotated to an end of said grooves.

4. A turn indicator for easy attachment to and removal from a motor cycle comprising:

a base unit which comprises:
   means for permanently attaching a first end of the base unit to a motorcycle;
   an electrical connector in electrical communication with an electrical system of the motorcycle;
   an inserting member at an end of the base unit substantially opposite the means for permanently attaching; and
   a cylindrical rotatable sleeve disposed about the inserting member, an interior surface of the sleeve bearing threads for engaging complementary threads on a lamp unit for maintaining the base unit in removable contact with the lamp unit; and the lamp unit which comprises:
   a lens portion containing an electric lamp for turn indication;
   an electrical connector in electrical communication with the electric lamp and in electrical contact with the electrical connector of the base unit when the lamp unit is retained in removable contact with the base unit;
   a receiving member sized to accept the inserting member of the base unit, the receiving member bearing, on an outer surface thereof, threads complementary to the threads of the rotatable sleeve so that insertion of the inserting member into the receiving member followed by rotation of the sleeve removably locks the base unit to the lamp unit; and
   a stalk portion disposed between the receiving member and the lens unit.

5. The turn indicator of claim 4, wherein receiving member further comprises parallel grooves extending longitudinally in a curvilinear direction, said grooves adapted to receive studs on said inserting member such that rotation of said receiving member while said grooves engage said studs releasably fixes said lamp unit on said base unit.

6. A turn indicator for easy attachment to and removal from a motorcycle comprising:

a lamp unit including a heel having an electrical contact;
a base unit including a shoe sized to slidingly receive the heel of the lamp unit therein, the shoe including an electrical contact positioned to contact the electrical contact of the heel when the heel is received by the shoe; and
means for releasably locking said heel to said shoe.

7. The turn indicator of claim 6 wherein said means for releasably locking the heel in said shoe comprises a pair of bayonets projecting from the heel and resiliently biased in a spaced apart relationship, said shoe including a slot positioned to receive the opposed bayonets therein when the heel is slid in said shoe such that the bayonets spring apart upon passing through the slot thereby locking the heel in said shoe.

8. The turn indicator of claim 6 wherein the electrical contact on the lamp unit comprises a resilient metallic strip located on a bottom surface of the heel.

9. The turn indicator of claim 6 wherein lamp unit includes a shield protecting said means for releasably locking said heel in said shoe.

* * * * *